Dec. 31, 1929.  K. BUTCHER  1,741,449
COLLAPSIBLE STRETCHER
Filed April 3, 1928  2 Sheets-Sheet 1
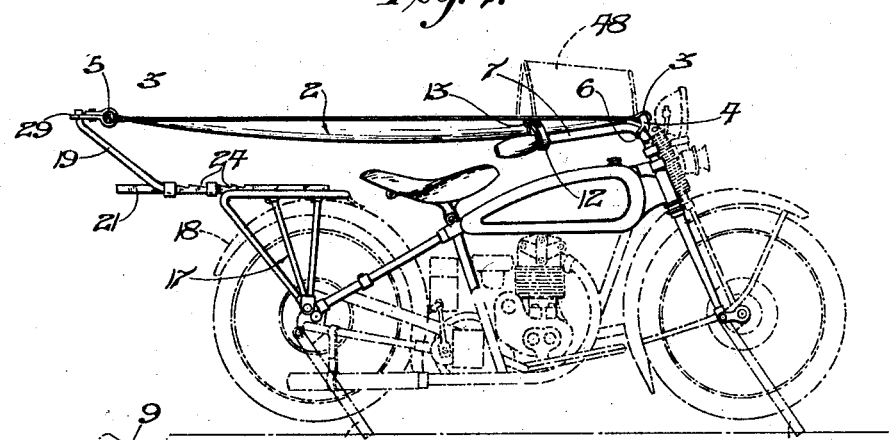
Fig. 1.
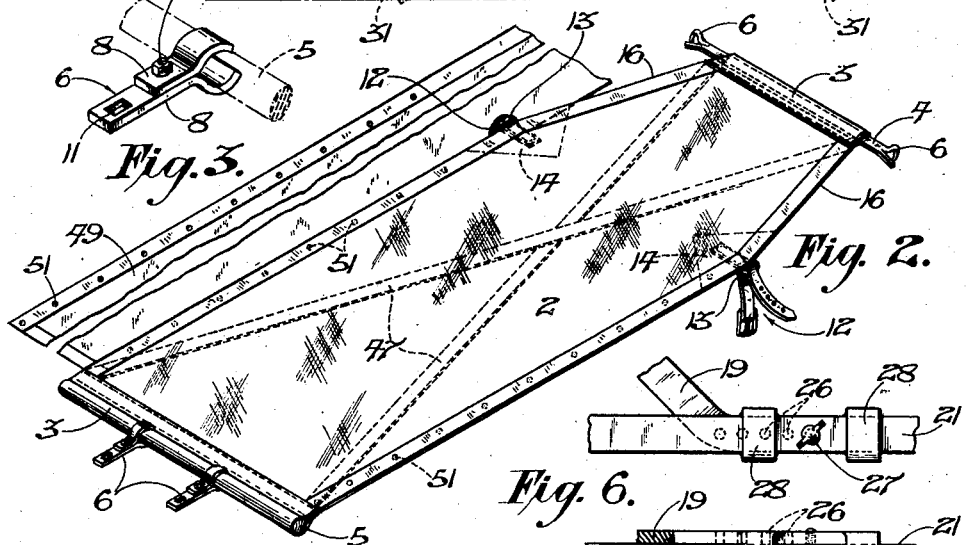
Fig. 3.
Fig. 2.
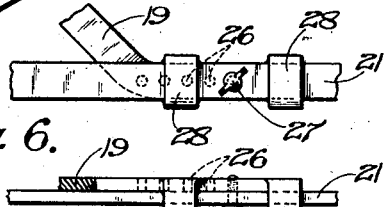
Fig. 6.
Fig. 7.
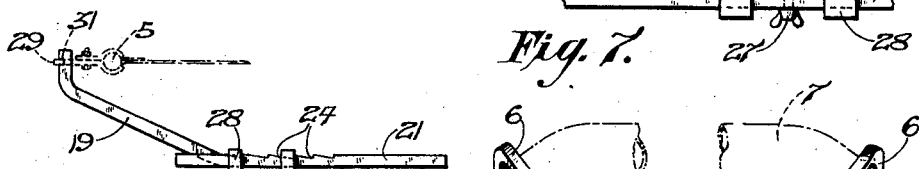
Fig. 4.
Fig. 8.
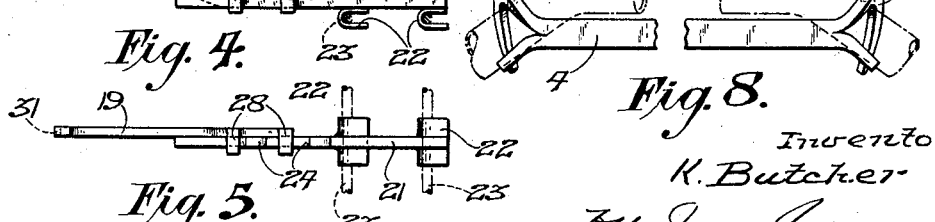
Fig. 5.
Inventor
K. Butcher
By
Atty Dec. 31, 1929.  K. BUTCHER  1,741,449
COLLAPSIBLE STRETCHER
Filed April 3, 1928   2 Sheets-Sheet 2
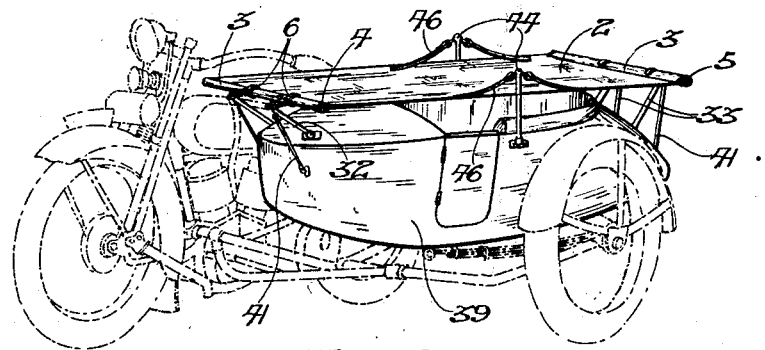
Fig. 9.
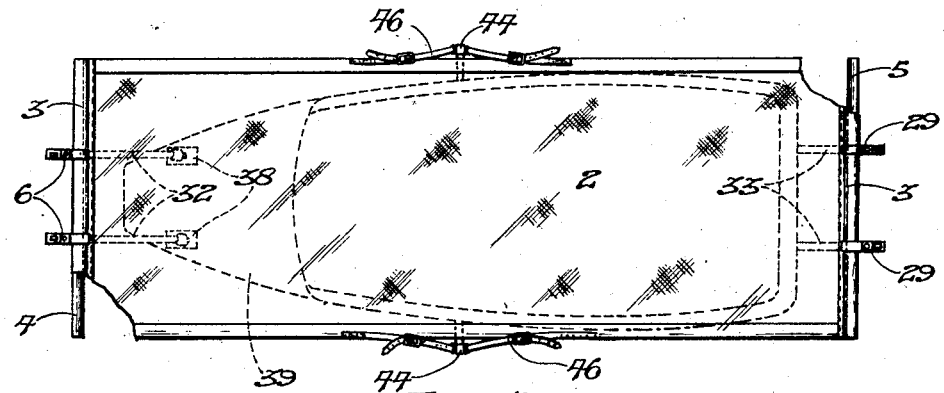
Fig. 10.
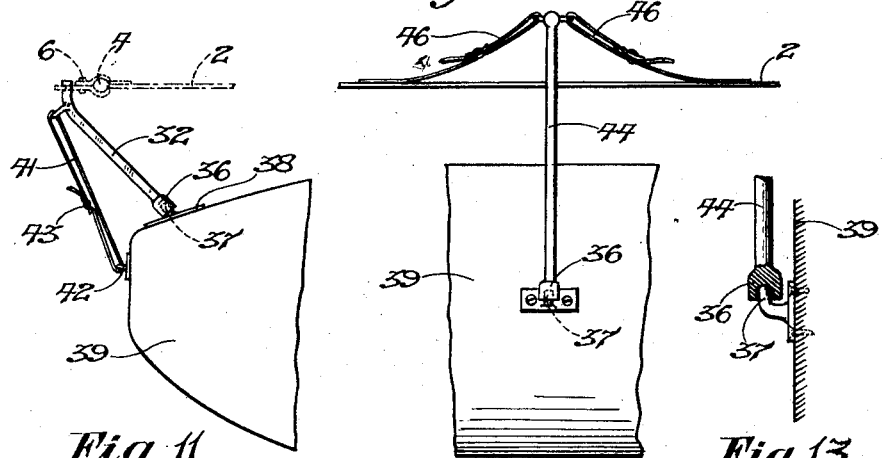
Fig. 11.
Fig. 12.
Fig. 13.
Inventor
K. Butcher Patented Dec. 31, 1929

1,741,449

UNITED STATES PATENT OFFICE

KEARNEY BUTCHER, OF ASCOT VALE, VICTORIA, AUSTRALIA

COLLAPSIBLE STRETCHER

Application filed April 3, 1928, Serial No. 267,085, and in Australia January 13, 1928.

This invention relates to a collapsible stretcher which is adapted for attachment, in position for use, upon and above a motor cycle or motor cycle side car for the use of campers and others.

As is well known, the usual collapsible stretchers include folding legs and other parts which render them too cumbersome and weighty for convenient carriage upon a motor cycle or side car.

The primary object of the present invention is to provide an extremely simple, inexpensive and efficient portable stretcher which may be readily attached to a motor cycle or side car so as to extend thereover and provide a comfortable and secure bed structure which may be quickly dismantled and/or disconnected from the cycle or side car and rolled or folded into a small space for convenient transport thereon.

Briefly, the invention comprises a canvas or like sheet of material forming the stretcher proper, means for detachably connecting the forward portion of such material to the handle bars of a motor cycle or to upward extensions from a side car, and means for connecting the rear portion of the sheet to a convenient part of the motor cycle, such as the luggage carrier or rear mudguard thereof, or to upward extensions from the side car in such a manner that the front and rear ends of the sheet are disposed approximately in horizontal alignment.

But in order that this invention may be better understood reference will now be made to the accompanying sheet of drawings which are to be taken as part of this specification and read herewith:—

Figure 1 is a side elevation, showing the invention applied to a motor cycle, parts of which are indicated in broken lines.

Figure 2 is a perspective view of the canvas or like stretcher sheet and apurtenant parts including a waterproof cover portions of which are broken away for the convenience of illustration.

Figure 3 is a detail perspective view of clips or connections attached to a rear cross bar, portion of which is indicated in broken lines.

Figure 4 is a side elevation on a reduced scale of one of the adjustable bars or struts for supporting the rear end of the stretcher sheet from a motor cycle, portion of the sheet being indicated in broken lines.

Figure 5 is a plan of the adjustble supporting bar seen in Figure 4.

Figure 6 is an enlarged fragmentary side view showing a modified means of adjusting said supporting bars.

Figure 7 is a plan of Figure 6.

Figure 8 is an enlarged plan showing a front cross bar of the stretcher sheet attached to the handle bars of a motor cycle, said handle bars being indicated in broken lines.

Figure 9 is a perspective view showing the invention applied to a side car of a motor cycle, the latter and the side car wheel being indicated in broken lines.

Figure 10 is a plan on a larger scale of the invention applied to a side car, parts being broken away to show the front and rear cross bars of the stretcher.

Figure 11 is a fragmentary side elevation showing means of attaching the front portion of the stretcher sheet to the side car body.

Figure 12 is a fragmentary side elevation showing means of attaching the intermediate portion of said sheet to the side car body, in accordance with Figure 10.

Figure 13 is an enlarged detail view showing a detachable connection between the lower end of one of the stretcher supporting bars or struts and the side car body.

The invention includes a sheet 2 of canvas or other suitable fabric or flexible material of appropriate length and width, the front and rear ends of this material being preferably provided with transverse folds or loops 3 to receive front and rear cross bars 4 and 5.

The said front and rear cross bars are preferably provided with laterally spaced clips or connections 6 whereby said cross bars may be detachably connected to a motor cycle or side car as hereinafter described.

In applying the invention to a motor cycle, the front clips or connections 6 may consist of hook-like members formed on the ends of said front cross bar and adapted to detachably engage the handle bars 7 of the cycle as seen in Figure 8. Any other suitable form of detachable connection may however, be employed for this purpose, for instance, said clips or connections may each consist of a pair of clamping plates 8 held together by clamping bolts or screws 9 and adapted to grip the said cross bars 4, 5, on the outside of the canvas or like loops or folds 3 through which the cross bars pass. These clamping plates may be provided with apertures 11 to receive projections from that portion of the cycle or side car to which the stretcher is to be attached.

Suitable intermediate connections are preferably provided for connecting the intermediate portion of the canvas or like sheet to the rear parts of the cycle handle bars. These intermediate connections may conveniently consist of straps 12 passing through links or eyelets 13 attached to the sides of the sheet 2 where the latter may be provided with reinforcing gussets 14 of leather or the like, the straps being adapted for attachment to the rear parts of the handle bars 7 thus providing increased rigidity or stability for the stretcher. From these intermediate connections to the aforesaid front connections, the side edges of the canvas or like sheet may converge inwardly as at 16, so that the forepart of the sheet, between the handle bars, is of reduced width.

In conjunction with the foregoing, means are provided to support the rear part of the canvas or like sheet 2 from a convenient portion of the cycle structure, such as the usual luggage carrier 17 or the rear wheel mudguard 18 or its supports. The sheet extends over this rear supporting means which is adapted to extend upwardly from the luggage carrier or the like in such a manner as to support the rear end of the sheet at a position approximately level with the front end thereof, which is attached to the handle bars as aforesaid.

The above mentioned rear supporting means preferably comprises a pair of longitudinal supporting bars or struts, each of which is formed in two sections, namely, a front section 19 and a rear section 21, these two sections being relatively adjustable in a longitudinal direction, so that the canvas or like sheet may be stretched as tightly as desired over the motor cycle.

Each of the said front sections 21 of the longitudinal supporting bars or struts is provided with suitable devices for attaching it to the luggage carrier, mudguard, or the like. These attaching devices preferably consist of depending U-shaped or hook-like lugs 22 carried by each of said front sections of the longitudinal supporting bars, and adapted to engage beneath the usual cross members 23 of the luggage carrier 17.

The rear section 21 of each of the longitudinal supporting bars is longitudinally adjustable on the respective front section by suitable adjusting means such as longitudinally spaced notches 24 (Figs. 1, 4 and 5) or adjusting holes 26 and bolts 27 whereby the rear sections of the bars may be adjusted longitudinally in relation to the front sections, and retained in the desired position by said adjusting means. The adjustable sections of the said bars may be conveniently guided in their longitudinal movement by guide lugs or eyelets 28 as indicated in Figures 4 to 7.

In order to support the rear end of the canvas or like sheet at the desired elevation above the motor cycle so as to be approximately level with the front connections 6 on the handle bars, the rear portions of the rear adjustable sections of the longitudinal supporting bars are upwardly and rearwardly inclined as indicated in Figures 1, 4 and 6. The rear extremities of these bars are adapted for attachment to the rear end of the canvas or like sheet by suitable means such as rear clips or connections 29 which may be clamped to the aforesaid rear cross bar 5 over the rear transverse fold 3 of the canvas sheet by means of clamping bolts 9 or the like, as previously mentioned. These rear clips or connections may be provided with apertures 11, as aforesaid to receive the elevated rear ends of the longitudinal supporting bars which may be recessed as at 31 to engage the rear edges of the apertures 11, whereby the supporting bar sections 21 are detachably connected to the rear end of the canvas or like sheet 2.

To erect the stretcher on a motor cycle, the front part of the canvas or like sheet 2 is first attached to the cycle handle bars as aforesaid, and the rear end of said sheet is connected to the elevated rear ends of the adjustable rear supporting bars 19, 21. The sheet may be then drawn as tightly as desired over the cycle by longitudinally adjusting the supporting bar sections 21 and securing them in the desired adjusted position by means of the notches 24 or other means so as to maintain the requisite tension on the sheet. It will be evident that the cycle, with the stretcher attached may be firmly supported in upright position by the usual hinged cycle stand or stands 31. To collapse the stretcher for transport or like purposes, the rear supporting bars 19, 21, may be disconnected from the luggage carrier or the like and wrapped within the sheet 2, which may then be strapped or otherwise suitably secured to the front of the handle bars 7 or to some other convenient part of the cycle.

In applying the invention to a motor cycle side car the aforesaid clips or connections 6, 29, on the front and rear cross bars 4, 5, of the canvas or like sheet may be detachably connected to the upper ends of front and rear supporting bars or struts 32, 33, which may be provided at their lower ends with sockets 36 adapted to detachably and freely engage short pins or studs 37 outstanding from plates 38 secured at suitable positions on the side car body 39.

The said front and rear supporting bars or struts are adapted to extend upwardly and outwardly from the side car body and the function of the pins or studs 37, engaging the lower ends of the struts is to prevent the latter from slipping off the body, at the same time permitting the struts to occupy different angular positions according to requirements.

In order to exert the desired longitudinal tension upon the stretcher sheet 2, when in position above the side car, straps or like ties 41 may be provided to connect the ends of the stretcher sheet to the adjacent end portions of the side car body. These straps or the like extend downwardly from the front and rear cross bars 4, 5, or the aforesaid clips or connections thereon, to the side car body where they may be secured by hooks or other suitable fasteners, indicated at 42. By means of buckles 43 or the like in these straps, the longitudinal tension on the sheet may be adjusted as desired.

In addition to the aforesaid front and rear supporting struts 32, 33, similar side struts 44 may be detachably mounted at suitable positions on the sides of the side car body, by means such as the aforesaid sockets 36 and pins or studs 37 which permit of the side struts assuming the desired upwardly and outwardly inclined attitude on the body.

The side struts 44 may be connected to the side edges of the canvas or like sheet by means of suitably arranged straps or the like 46 whereby said sheet is held in the desired spread position notwithstanding inward lateral strains thereon.

In order to erect the stretcher above a side car it is merely necessary to fit the lower ends of the various supporting struts over the pins or studs 37 projecting from the side car body, the ends, and, if desired, the sides of the stretcher sheet being connected to the upper ends of said struts as previously described, whereupon the sheet may be drawn as tightly as desired by means of the aforesaid straps or the like. The stretcher sheet is now suspended over the side car body so as to provide a secure and comfortable bed for the user. To dismantle the stretcher, it is merely necessary to disconnect the lower ends of the supporting struts and the straps or the like 41 from the side car body whereupon the various parts may be rolled or folded together and packed into a small space for storage or transport.

If desired, coiled tension springs may be fitted at suitable positions, as for example, in the aforesaid straps or the like so as to provide resilient suspension means for the stretcher sheet, which may also be provided with cross reinforcing bands 47 extending diagonally between the corners of the sheet. Furthermore means may be provided for attaching a mosquito net 48 and/or a waterproof cover 49 to the stretcher for use if and when required. The waterproof cover may be conveniently attached to the stretcher sheet near its side edges by means of hooks and eyes 51 or other suitable detachable fasteners.

It will be evident that in addition to its function as a stretcher for the convenience of motor cyclists, and side car passengers, the invention may also serve, when in its operative position, as a protective cover for the cycle or side car and for any garments or other articles which may be suspended from the cycle frame or placed within the side car body, beneath the spread stretcher sheet.

It is intended and desired that the above description should be interpreted as illustrative of suitable practical embodiments of the invention and not in a limiting sense, as various alterations, modifications and/or additions may be embodied in the means for attaching the stretcher sheet in a substantially horizontal position above the cycle or side car, without departing from the spirit and scope of the invention as defined by the appended claims.

Having now described my invention what I claim as new and desire to secure by Letters Patent is:—

1. A collapsible stretcher for attachment to motor cycles, comprising in combination an elongated sheet of flexible material, means for detachably connecting the front end of said sheet in spread position to the handle bars of a motor cycle, and means adapted for attachment to a rear part of the cycle for supporting the rear end of said sheet substantially in horizontal alignment with said front connecting means.

2. A collapsible stretcher for attachment to motor cycles comprising an elongated sheet of flexible material, hook-like members adapted for detachably connecting the front end of said sheet in spread position to the handle bars of a motor sycle, and means adapted for attachment to a rear part of the cycle for supporting the rear end of said sheet substantially in horizontal alignment with said front connections.

3. A collapsible stretcher for attachment to motor cycles consisting in the combination of a sheet of flexible material attached at its ends to front and rear cross bars, hook-like members carried on the ends of said front cross bar and adapted for detachably connecting the front end of said sheet in spread position to the handle bars of a motor cycle, laterally spaced rear connections on said rear cross bar, and means associated with said rear connections and adapted for attachment to a rear part of the cycle for supporting the rear end of said sheet substantially in horizontal alignment with said hook-like front connections.

4. A collapsible stretcher for attachment to motor cycles, comprising an elongated sheet of flexible material, means for detachably connecting the front end of said sheet in spread position to the handle bars of a motor cycle, and supporting bars having front and rear sections provided with means by which they are relatively adjustable in the direction of their length, said front sections being adapted for connection to a rear part of a motor cycle, whilst said rear sections are upwardly and rearwardly inclined and are adapted for connection at their upper ends to the rear part of the stretcher sheet, for the purpose specified.

5. A collapsible stretcher for attachment to motor cycles, comprising an elongated sheet of flexible material, means for detachably connecting the front end of said sheet in spread position to the handle bars of a motor cycle, supporting bars having front and rear sections which are relatively adjustable in the direction of their length, said front sections being adapted for connection to a rear part of a motor cycle, whilst said rear sections are adapted for connection to the rear end of the stretcher sheet at a point above said front sections, guide lugs carried by one of said sections of each supporting bar and adapted to slidably accommodate the other of said sections, and means for retaining said sections in different longitudinally adjusted positions, for the purpose specified.

6. A collapsible stretcher for the purpose indicated, consisting in the combination of a stretcher sheet of flexible material attached at its ends to front and rear cross bars, the front cross bar having ends to engage with the handle bar of a motor cycle, a connection at the rear bar including adjustable sections for adjustably fastening same to the rear portion of the motor cycle, whereby said sheet may be supported in a substantially horizontal and spread position upon and above a motor cycle.

In testimony whereof I affix my signature.

KEARNEY BUTCHER.